Aug. 10, 1954  D. R. DONNELL  2,685,859
MIRROR POSITION INDICATOR MEANS
Filed Sept. 16, 1952

INVENTOR
DON R. DONNELL
BY
Mason & Graham
ATTORNEYS

Patented Aug. 10, 1954

2,685,859

UNITED STATES PATENT OFFICE 2,685,859

MIRROR POSITION INDICATOR MEANS

Don R. Donnell, Los Angeles, Calif.

Application September 16, 1952, Serial No. 309,883

5 Claims. (Cl. 116—124)

This invention has to do with means for indicating the position of a tiltable mirror, such as the conventional rear view mirror commonly used in motor vehicles.

By way of example, I shall disclose my invention in relation to the conventional rear view mirror used in motor vehicles although the invention may have several other applications where means are needed for indicating the position of a tiltably mounted member.

Rear view mirrors as used in automobiles and the like are often accidentally dislocated from adjusted position with the result that the operator of the vehicle must readjust the mirror carefully. Also, as is common, where more than one person operates the vehicle, each person usually requires a different setting or adjustment of the mirror.

It is an object of my invention to provide a novel means for indicating the position of a tiltable mirror or the like whereby once a person has adjusted the mirror and noted the position thereof, he can subsequently return the mirror to adjusted position should it be displaced.

Another object is to provide a simple mirror-position indicator device which is inexpensive and can readily be installed at any time.

A further object is to provide a device of the type indicated which tends to hold the mirror in adjusted position.

These and other objects will be apparent from the drawing and the following description thereof.

Referring to the drawing.

Figure 1:
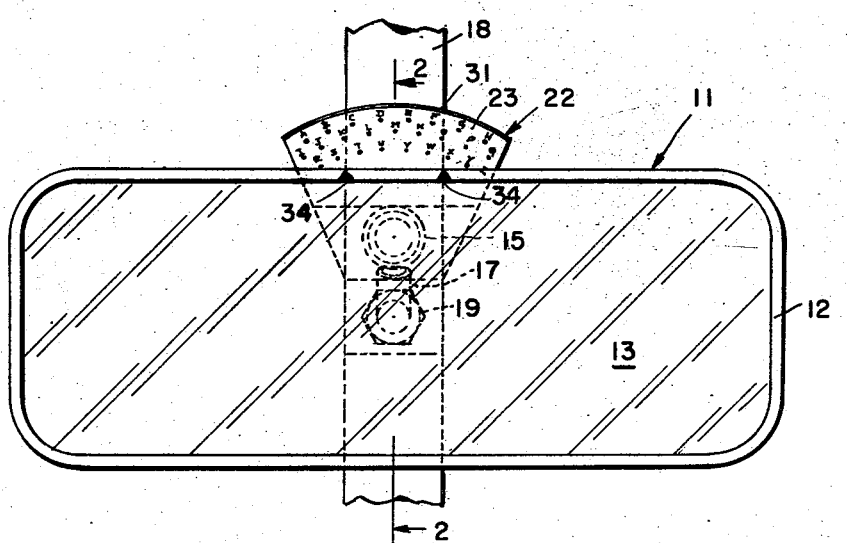
Fig. 1 is a face view of a tiltably mounted mirror and showing a device embodying the invention associated therewith.

More particularly describing the invention, numeral 11 generally indicates a tiltable mirror member having a frame 12, and a silvered glass 13. The frame is provided with a socket portion 15 to receive a ball portion 16 on the end of a post or standard 17 which is mounted on a support 18. The post 17 may be provided with a screw-threaded end portion 17' which is received within the support 18 and a lock nut 19 may be mounted thereon.

The mirror is adjustably tiltable by reason of the ball-and-socket joint, the action of the joint normally being sufficiently stiff so that the mirror will remain in adjusted position.

Figure 3:
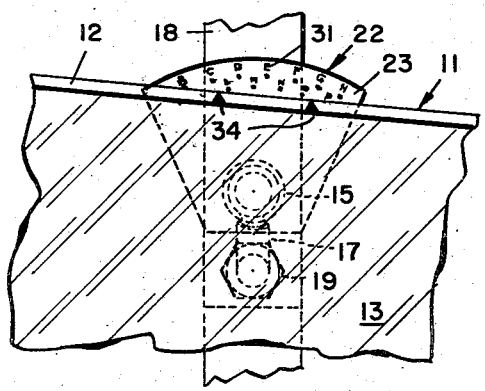
Fig. 3 is a fragmentary face view similar to Fig. 1 showing the mirror tilted to a different angular position than that of Fig. 1.
Figure 2:
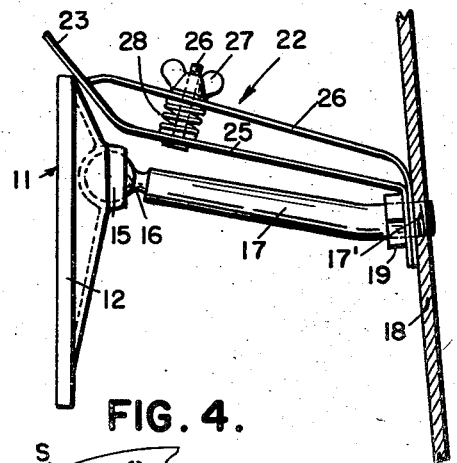
Fig. 2 is a sectional view on line 2—2 of Fig. 1.

For the purpose of indicating the position of a mirror I provide an indicator attachment, generally indicated by 22, which includes an indicator plate 23 of thin, flexible material, such as metal, and bracket means supporting this. In the form of the invention shown in Figs. 1-3, the bracket means includes an extension 25 upon the plate and a spring backing member 26. These are apertured at their inner ends to receive the member 17 so that they can be mounted as shown in Fig. 2.

The indicator plate is somewhat inclined with respect to the main portion of the part 25, and the member 26 has a free end portion which bears against the back of the indicator plate.

Figure 4:
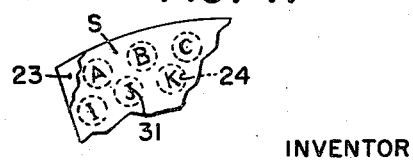
Fig. 4 is a fragmentary enlarged face view of an indicator plate.

The purpose of the backing plate 26 it to yieldably urge the indicator plate against the margin or edge of the mirror member. For the purpose of adjusting the stiffness of the assembly as a whole, I provide a compression spring 28 between the backing member 26 and part 25 with a screw 26 and wing nut 27 for compressing the spring. The indicator plate itself may be provided with any suitable indicia such as that indicated by 31 on the face thereof. In Fig. 4 I show a modified arrangement for rendering the indicia carried by the indicator plate more visible. Here the plate 23 has apertures 24 and over the front face of the plate I affix a transparent plastic sheet S having the indicia printed thereon in position to overlie the apertures. Thus the light through the apertures increases visibility of the indicia.

On the margin of the mirror member I provide a pair of laterally spaced pointer indicia marks, indicated by 34, for use in cooperation with the indicator plate indicia.

It will be apparent from the above description that the two indicia marks 34 in conjunction with the indicia on the indicator plate 23 give a sensible indication of the angular position of the mirror member. By way of illustration the mirror is shown in one position in Fig. 1 and in another position in Fig. 3. By reason of the fact that the indicator plate is yieldably urged against the mirror at all times so that there is no gap between the two, and also serves as a means of tending to hold the mirror in adjusted position.

Figure 5:
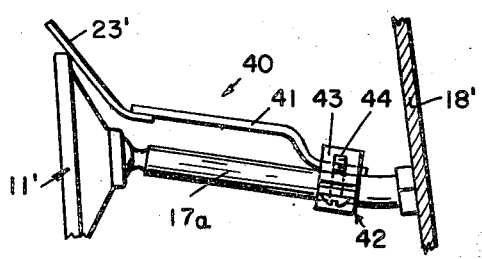
Fig. 5 is a side elevational view of another form of the invention shown mounted on a mirror standard.

In Fig. 5 I show a modified form of the invention, generally indicated by 40, shown mounted on the mirror 11' having a standard or post 17a attached to the support 18'. In this form of the invention I provide an indicator plate which I have designated 23'. This may be the same, essentially, as the plate 23 previously described. I mount the plate on the end of a spring bracket 41 as by welding or soldering the parts or riveting them, the actual connection means not being shown. The spring bracket 41 is attached to the post 17 by means of a conventional clamp 42 comprised of similar plates 43 and screws 44. It will be apparent that the device shown in Fig. 5 operates in the same manner as that previously described. In this connection it is pointed out that the spring bracket 41 is sprung upwardly from its normal position when installed so that it urges the plate 23' against the mirror.

I also contemplate that the device shown in Fig. 2 may be provided with suitable means for mounting it directly on the post 17 as by clamping it thereto and that the device 40 may be modified to be mounted similarly to the device 22.

Although I have shown and described two preferred forms of my invention, I contemplate that various changes and modifications may be made without departing from the scope of the invention which is indicated by the following claims.

I claim:

1. A mirror position indicator means for use with a tiltably mounted mirror member having indicia adjacent an edge thereof, comprising a flexible indicator plate positioned behind said mirror member adjacent the edge portion thereof having indicia, said plate carrying indicia on the side thereof adjacent the mirror member for cooperative association with the indicia on said mirror member, and a spring bracket means carrying said indicator plate adapted to be mounted on a support, said bracket being so mounted and constructed as to yieldably urge said plate against said mirror member.

2. A mirror position indicator means for use with a tiltably mounted mirror member having indicia adjacent an edge thereof, comprising a flexible indicator plate positioned behind said mirror member adjacent the edge portion thereof having indicia, said plate carrying indicia on the side thereof adjacent the mirror member for cooperative association with the indicia on said mirror member, an integral bracket extending from said plate for attachment to a support, said bracket having the quality of springiness and being so mounted as to yieldably urge said plate against said mirror member.

3. A mirror position indicator means for use with a tiltably mounted mirror member having indicia adjacent an edge thereof, comprising a flexible indicator plate positioned behind said mirror member adjacent the edge portion thereof having indicia, said plate carrying indicia on the side thereof adjacent the mirror member for cooperative association with the indicia on said mirror member, an integral bracket extending from said plate for attachment to a support, a backing member free at one end and secured at the other end with said bracket at the region of attachment of said bracket to said support, said free end of said backing member engaging the back of said plate, and adjustable spring tension means between said backing member and said bracket, said bracket being so mounted and constructed as to yieldably urge said plate against said mirror member.

4. Indicator means as set forth in claim 3 in which said backing member is a flat spring member.

5. A mirror position indicator means for use with a tiltably mounted mirror member having indicia adjacent an edge thereof, comprising a flexible indicator plate positioned behind said mirror member adjacent the edge portion thereof having indicia, said plate carrying indicia on the side thereof adjacent the mirror member for cooperative association with the indicia on said mirror member, an integral bracket extending from said plate for attachment to a support, a backing member free at one end and secured at the other with said bracket at the region of attachment of said bracket to said support, said free end of said backing member engaging the back of said plate, said bracket being so mounted and constructed as to yieldably urge said plate against said mirror member.

References Cited in the file of this patent

UNITED STATES PATENTS

| Number | Name | Date |
|--------|------|------|
| 1,879,592 | Thomas | Sept. 27, 1932 |